United States Patent
Anupam et al.

(10) Patent No.: US 6,411,989 B1
(45) Date of Patent: Jun. 25, 2002

(54) APPARATUS AND METHOD FOR SHARING INFORMATION IN SIMULTANEOUSLY VIEWED DOCUMENTS ON A COMMUNICATION SYSTEM

(75) Inventors: Vinod Anupam, Scotch Plains; Narain H. Gehani, Summit, both of NJ (US); Viswanath Kadambari, Herndon, VA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/221,069

(22) Filed: Dec. 28, 1998

(51) Int. Cl.$^7$ .............................................. G06F 17/00
(52) U.S. Cl. ..................... 709/204; 709/206; 709/205; 709/217; 709/219; 709/203
(58) Field of Search ................... 709/204, 205; 700/204, 205, 206, 202, 217, 219, 227, 228, 230

(56) References Cited

U.S. PATENT DOCUMENTS

| | | | | |
|---|---|---|---|---|
| 5,862,330 A | * | 1/1999 | Aunpam et al. | 709/204 |
| 5,991,796 A | * | 11/1999 | Anupam et al. | 709/206 |
| 6,070,185 A | * | 5/2000 | Anupam et al. | 709/204 |
| 6,151,020 A | * | 11/2000 | Palmer et al. | 345/329 |
| 6,151,622 A | * | 11/2000 | Fraenkel et al. | 709/205 |
| 6,175,842 B1 | * | 1/2001 | Kirk et al. | 707/513 |
| 6,181,689 B1 | * | 1/2001 | Choung et al. | 370/352 |
| 6,230,171 B1 | * | 5/2001 | Pacifici et al. | 707/512 |
| 6,240,443 B1 | * | 5/2001 | Suzuki et al. | 709/204 |

OTHER PUBLICATIONS

Souya et al. Joint Class Experiments Based on Realtime Web–browser Synchronization. IEEE Online. Jul., 15–17 1998. pp 367–372.*

Min et al. A Distributed Multimedia Conferencing System for Distance Learning. IEEE Online. Apr. 20–21, 1998.*

Lee et al. Design and Implementation of Important Applications in a Java–based Multimedia Digital Classroom. Jun. 11–13, 1997. pp 264–270.*

U.S. application No. 09/133,716, Anupam et al., filed Aug. 13, 1998.

U.S. application No. 08/850,532, Anupam et al., filed May 2, 1997.

U.S. application No. 08/683,072, Anupam et al., filed Jul. 16, 1996.

* cited by examiner

Primary Examiner—Glenton B. Burgess
Assistant Examiner—Abdullahi E. Salad
(74) Attorney, Agent, or Firm—Thomas Stafford

(57) ABSTRACT

Computer users may utilize different web browsers to access a server system on the World Wide Web (WWW) to create or join a collaborative session. One or more controllers connect the users or collaborators in a session in the server system. This is realized by establishing a so-called "shared Web-top", i.e., a work space, in which different in-document applications can be run and can be interactively, collaboratively shared by a plurality of users. Specifically, this is realized by employing a surrogate that includes a polling loop which periodically checks a shared document structure for changes in prescribed properties, and transmits the detected changes to surrogates of other users, i.e., at least one other collaborator, via a communication channel. To this end, a prospective user of the shared Web-top accesses a system, which transmits mobile code to the user's computer to create a surrogate thereon. The surrogates created for the users of the shared Web-top are connected by at least one controller in the system and individually serve as an interface between the controller and the respective browsers on the users computers. Advantageously, through our unique use of the polling loop in the surrogate, functionality is realized in which, as one user inputs data into a shared document, for example, into one or more forms in a document, the same data appears in the other user's browser, via the detected changes in prescribed properties of the one or more forms being transmitted over the communication channel to the users' computers and, therein, to their surrogates.

42 Claims, 6 Drawing Sheets

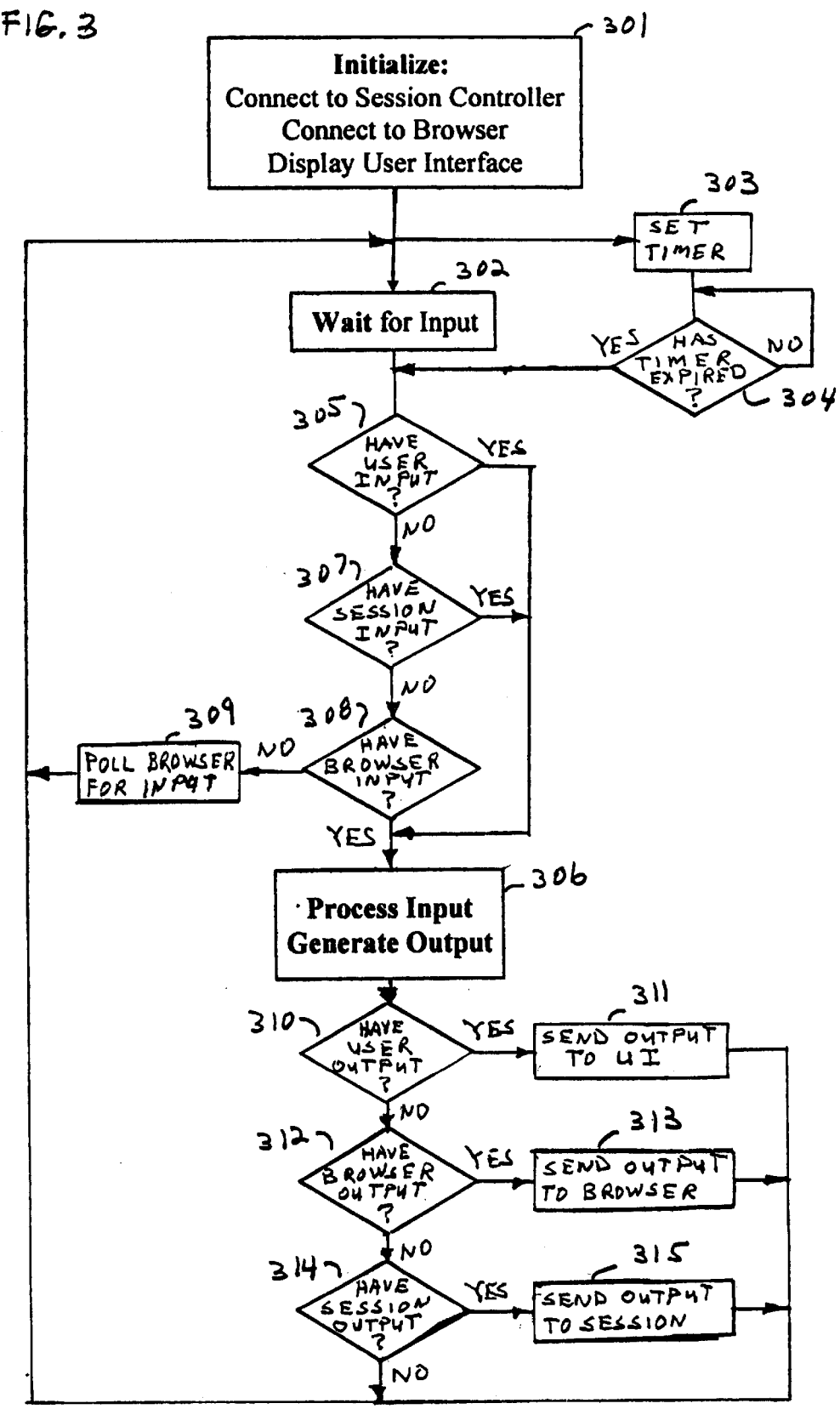

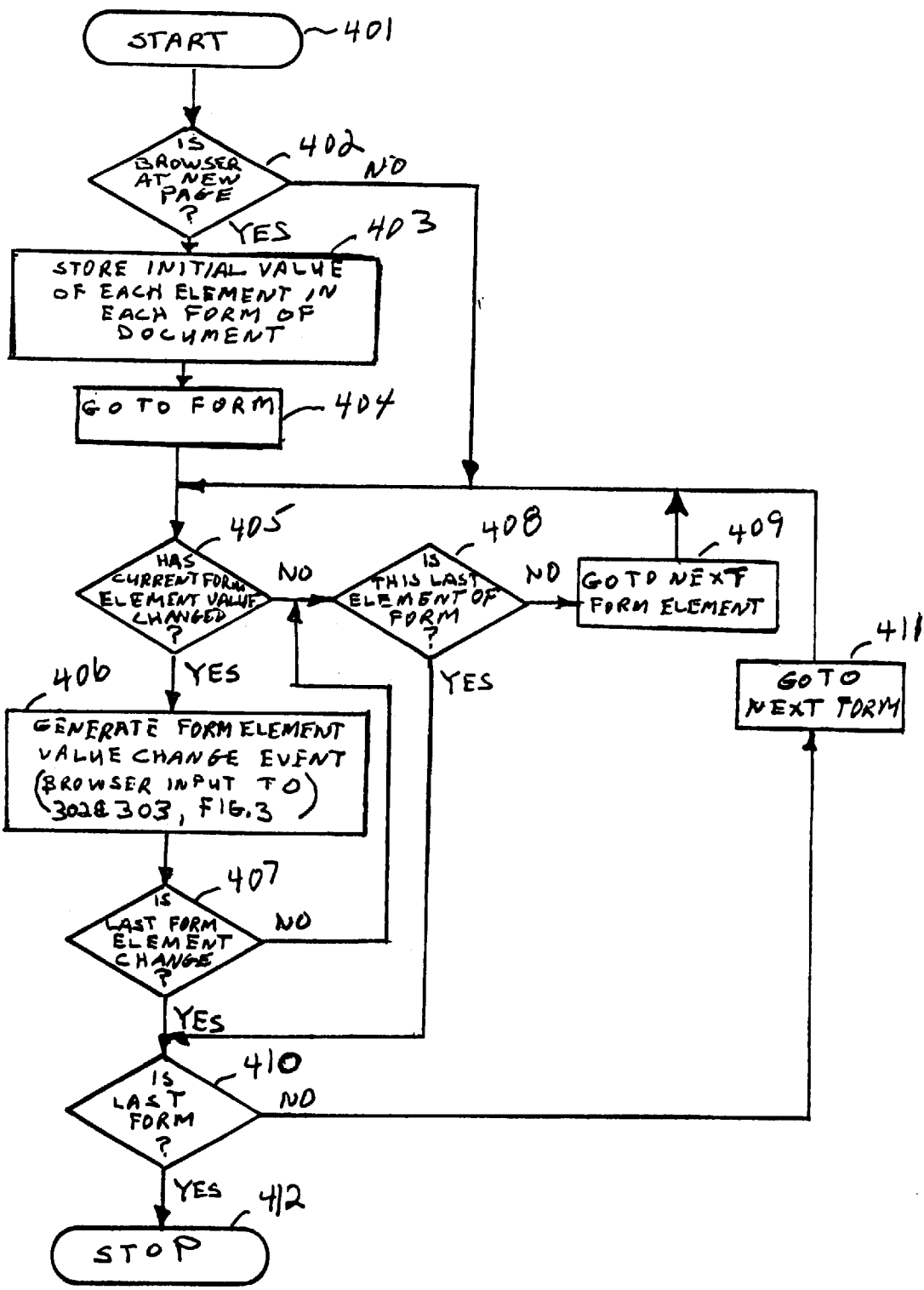

APPARATUS AND METHOD FOR SHARING INFORMATION IN SIMULTANEOUSLY VIEWED DOCUMENTS ON A COMMUNICATION SYSTEM

RELATED APPLICATIONS

U.S. patent applications Ser. No. 09/221,068 still pending and Ser. No. 09/221,067 still pending were filed concurrently herewith. U.S. patent application Ser. No. 09/133,716 now U.S. Pat. No. 5,991,796 was filed on Aug. 13, 1998 which is a continuation of U.S. patent application Ser. No. 08/683,072 which was filed on Jul. 16, 1996, now U.S. Pat. No. 5,991,796 issued Nov. 23, 1999, and U.S. patent application Ser. No. 08/850,532 which was filed on May 2, 1997, now U.S. Pat. No. 6,070,185 issued May 30, 2000.

FIELD OF THE INVENTION

The invention relates to systems and methods for providing communications between users over a computer network and, more particularly, to systems and methods for providing collaborative browsing of information and interactive communications on the World Wide Web (WWW) or the "web".

BACKGROUND OF THE INVENTION

Computer users can access many resources on an expansive international network of computer networks known as the Internet. WWW is a graphical subnetwork of the Internet. With common "web browser" software, for example, the NETSCAPE browser, users can readily access Internet information or services provided by web servers on the WWW.

Many Internet services allow communications between users. For example, two or more computer users may access a designated web server providing a "text-chat" service, which allows users to communicate interactively in text with one another in real time.

Computer users can also share web browsing experiences using a SHARED MOSAIC browser. To that end, each user is required to have his/her own copy of the SHARED MOSAIC software on a computer. To establish links between a user and his/her collaborators, the user needs to communicate to the collaborators beforehand, for example, by email or telephone, an Internet protocol (IP) port number identifying his/her particular browser. Then, the collaborators run the respective browsers on their computers and enter the IP port number as communicated, thereby establishing the links through the Internet between the user's computer and the collaborators' computers. As the user is visiting a web site of interest, he/she can select an option provided by the browser to share with his/her collaborators the same information from the web site through the established links.

More recently, a technique has been developed for realizing shared browsing using unmodified browsers and servers. A client-side executable content, know as a surrogate, is employed that is dynamically downloaded into the user's browser. The browser communicates with a collaborator's surrogate and allows all of the users' so-called "connected" browsers to move from page to page of a document in synchrony.

Notwithstanding the prior known collaborative browser arrangements, a problem still exists concerning the users being able to collaborate interactively regarding the content of a shared document or the like.

SUMMARY OF THE INVENTION

This and other problems and limitations of prior interactive collaboration apparatus and/or techniques are overcome by establishing a so-called "shared Web-top", i.e., a work space, in which different in-document applications, for example, within a document page, can be run and can be interactively, collaboratively shared by a plurality of users.

Specifically, this is realized by employing a surrogate that includes a polling loop that periodically checks a shared document structure for changes in prescribed properties, and transmits the detected changes to surrogates of other users, i.e., at least one other collaborator, via a communication channel. To this end, a prospective user of the shared Web-top accesses a system that transmits code to the user's computer to create a surrogate thereon. The surrogates created for the users of the shared Web-top are connected by at least one controller in the system and individually serve as an interface between the controller and the respective browsers on the users' computers.

Advantageously, through our unique use of the polling loop in the surrogate, functionality is realized in which, as one user inputs data into a shared document, for example, into one or more forms in a document, the same data appears in the other user's (users') browser (browers), via the detected changes in the prescribed properties of the one or more forms being transmitted over the communication channel to the users' computers and, therein, to their surrogates.

BRIEF DESCRIPTION OF THE DRAWING

FIG. 3 is a flowchart illustrating the steps taken in a surrogate employed in the process of FIGS. 2A and 2B and including an embodiment of the invention;

FIG. 4 is a flowchart depicting the steps of applicants' unique polling loop employed in the surrogate of FIG. 3.

DETAILED DESCRIPTION

Figure 1:
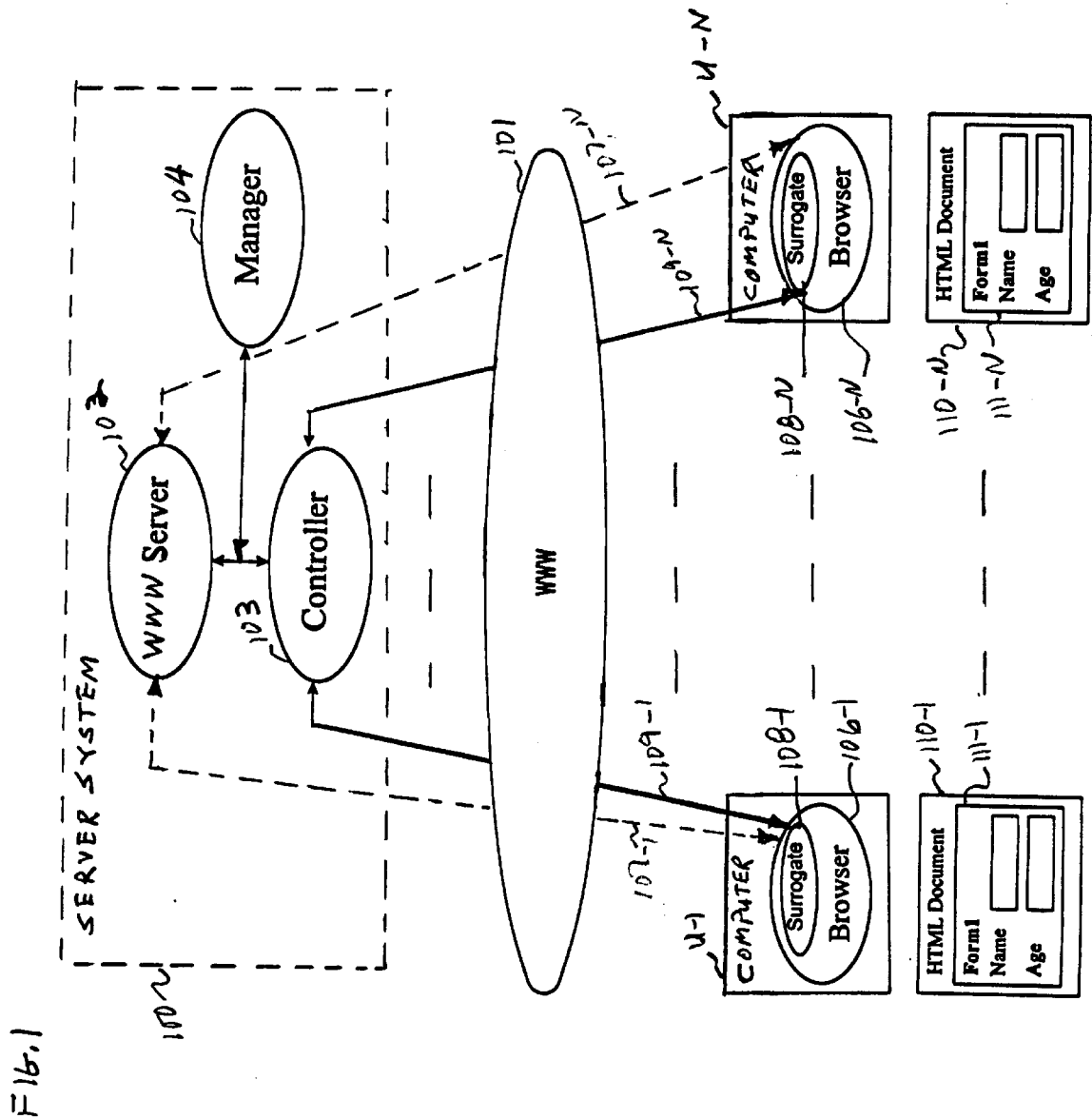
FIG. 1 is a simplified block diagram of a server system including an embodiment of the invention for obtaining and exchanging information over the WWW.

FIG. 1 shows, in simplified block diagram form, server system 100 embodying the principles of the invention, which is connected to the World Wide Web (WWW) 101 as a web server. Server system 100 includes WWW server 102, controller 103 and manager 104. Advantageously, server system 100 operates compatibly with standard web browsers such as the NETSCAPE browser, the standard hypertext transfer protocol (HTTP) and hypertext markup language (HTML). Among other things, server system 100 provides users with services of (a) collaborative browsing of HTML documents at various web sites on WWW 101, and (b) real-time, interactive collaborative communications between the users. Specifically, with server system 100, during a collaborative browsing session, multiple users or collaborators are allowed to synchronously and collaboratively input data into a document or otherwise edit the document. The collaborators may also interact with one another through text-chat communications, for example. In addition, server system 100 allows users to join and exit an on-going session and is capable of scaling its capacity to accommodate a changing number of sessions and collaborators in a particular session.

As shown in FIG. 1, a user may utilize computer U-1 to access system 100 over WWW 101 at a predetermined URL. Computer U-1 may be a conventional personal computer (PC) running standard web browser 106-1, such as the NETSCAPE browser. As soon as U-1 is connected to server system 100 through link 107-1, manager 104 in system 100 starts communicating with U-1 through web browser 106-1 and WWW server 102 having a common gate interface (CGI).

Figure 2A:
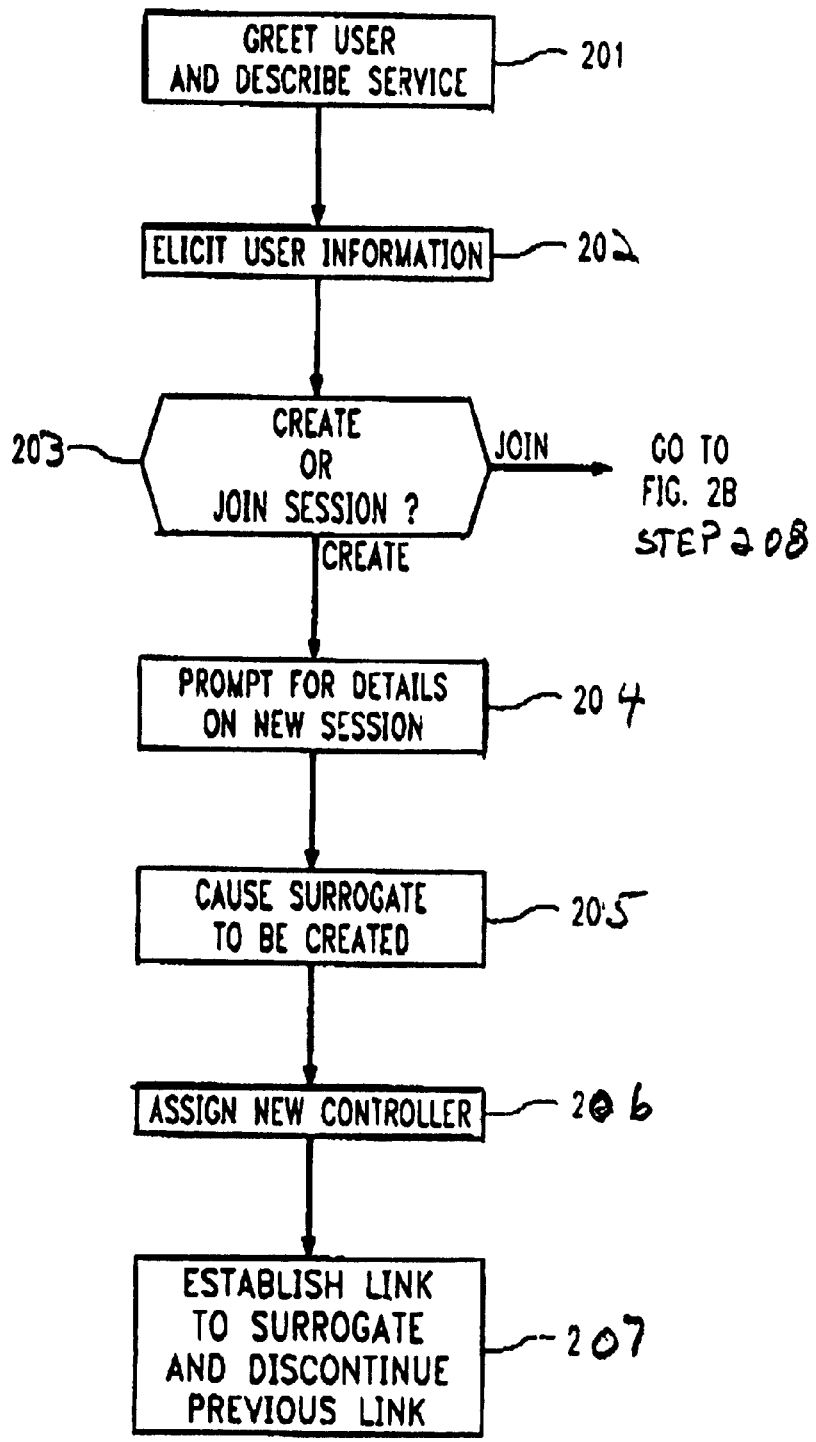
FIGS. 2A and 2B form a flow chart depicting the steps in carrying out the operation of the system of FIG. 1.
Figure 2B:
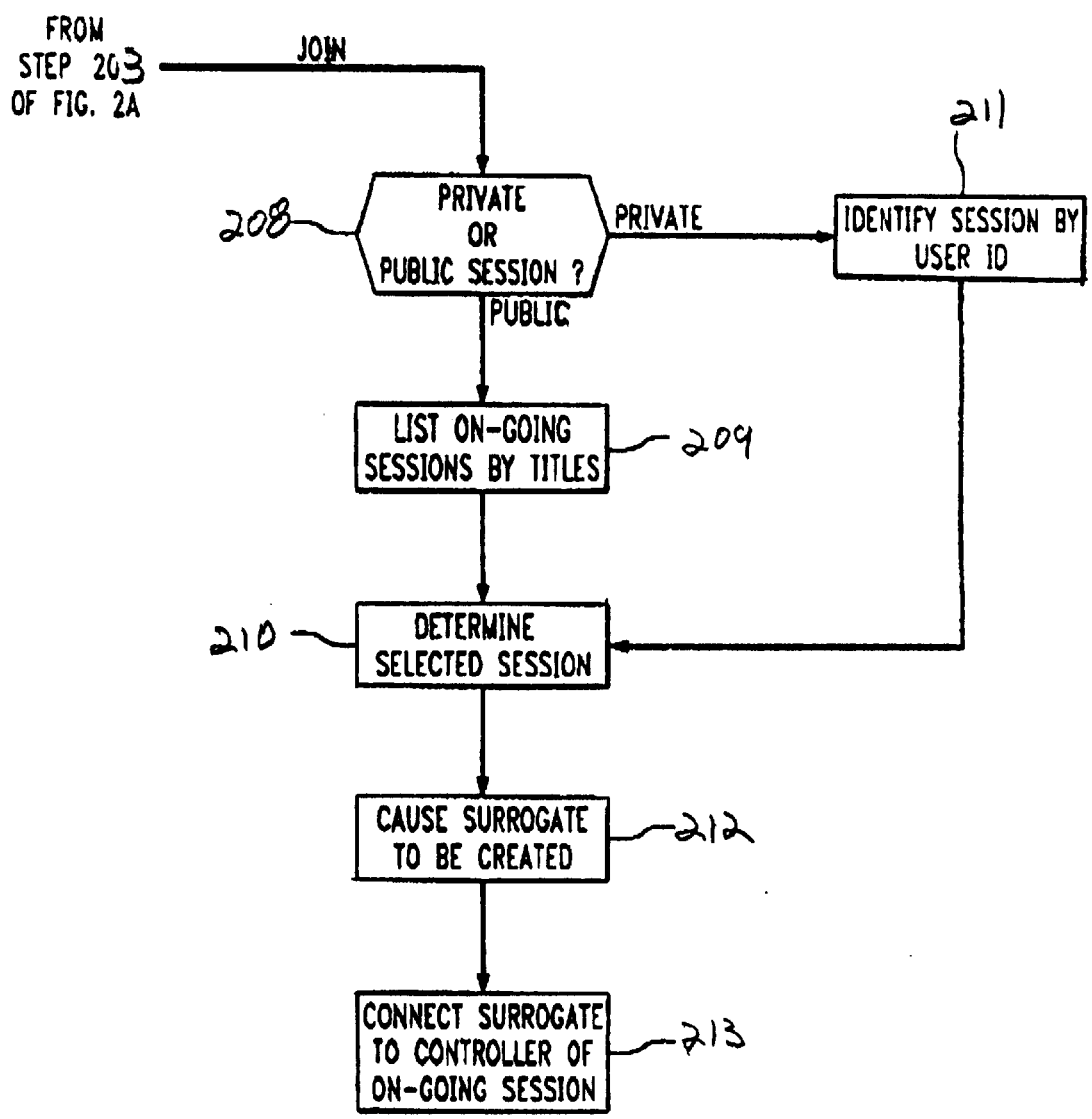

Manager 104 includes a service routine shown in FIG. 2A and FIG. 2B for helping a user to establish an interactive collaborative browsing session. FIGS. 2A and 2B illustrates the steps of a service routine including an embodiment of the invention. At step 201, manager 104 causes a "home page" to be displayed on U-1, which greets the user, and describes the service provided by system 100. Manager 104 then elicits from U-1 user information, as indicated at step 202. This information includes a user identification (ID), password and other administrative data necessary for ensuring that the user is an authorized user. At step 203, manager 104 queries U-1 as to whether the user wants to create a session, or join an on-going session. In this instance, the user of U-1 chooses to create a session. Manager 104, at step 204, then prompts the user for the details on the session to be created, such as the purpose of or the document to be addressed during the session, and whether it is a private or public session. By way of example, if it is a private session, a would-be collaborator must identify the user by his/her user ID who created the session in order to join it. It is assumed that all sessions would be private that deal with filling-in personal or otherwise sensitive user information into documents, i.e., forms or the like. If it is a public session, the topic of or the document to be edited or filled in during the session is listed and can be reviewed by a prospective collaborator. In this embodiment of the invention, whether private or public, the session is interactive among the collaborators in order to collaboratively input data into the document, for example, into one or more forms in the document. A simple example document 110-1 including form 111-1 is shown in FIG. 1. Note that in this embodiment, all of documents 110-1 through 110-N and forms 111-1 through 111-N are identical at all user computers U-1 through U-N.

In this instance, the user of U-1 replies that the session to be created is private and the purpose of the session is to complete, for example, a medical insurance form. Manager 104 proceeds to start the new session and causes surrogate 108-1 to be created within browser 106-1 in computer U-1, as indicated at step 205. To that end, system 100 transmits to computer U-1 mobile code pursuant to a mobile programming language such as the standard JAVA language. Thus, in this instance, the mobile code may be in the form of a JAVA applet. (For a discussion on JAVA applets see, for example, "Teach Yourself JAVA in 21 Days, Professional Reference Edition" *Sam's Net*, Indianapolis, Ind., 1996 and/or "Learn JAVA Now", *Microsoft Press*, 1996. Surrogate 108-1 is realized when the applet starts to run within browser 106-1 as soon as it reaches computer U-1. Surrogate 108-1 is further described below in relationship to FIG. 3, and it suffices to know for now that it serves as an assistant to browser 106-1 to carry out the session.

Since in this instance it is a new session, manager 104 at step 206 assigns a new controller, numerically denoted 103, to control and regulate the session. Manager 104, at step 207, causes controller 103 to be connected to surrogate 108-1 through link 102-1, and at the same time discontinues link 107-1. Surrogate 108-1 serves as an interface between, browser 106-1 and controller 103. Among other things, surrogate 108-1 monitors user interaction with browser 106-1, and reports the user interaction to controller 103. It should be noted at this point that surrogate 108-1 is realized using a JAVA applet, which is transmitted to and executed on U-1 on an on-demand basis. Indeed, no software needs to be installed or maintained on the user computer beforehand, as is required in traditional applications. Thus, any standard JAVA-enabled browser such as the NETSCAPE browser can be utilized to implement the invention. In other words, system 100 does not require the users to have specialized browser software to take advantage of the inventive service.

After the new session starts, the user of computer U-1 may change the URL with browser 106-1 to a web site to obtain information concerning the medical form to be completed. The new URL is transmitted by surrogate 108-1 to controller 103, where the new URL is recorded and conveyed to the surrogates of other collaborators, if any, in the same session. At the same time, browser 106-1 accesses a web server at the new URL, and opens on computer U-1 a HTLM document 110-1 provided by the web server, including in this example, an insurance medical form 111-1.

A second user may utilize computer U-N to access system 100 (FIG. 1) at the predetermined URL to join an on-going session. After computer U-N establishes a link 107-N (FIG. 1) to WWW server 102, manager 104 similarly performs steps 201 and 202 of FIG. 2A, previously described. However, at step 203, the user of U-N in this instance chooses to join an on-going session. As such, manager 104 queries U-N as to whether the second user wants to join a private session or public session, as indicated at step 208 in FIG. 2B. In this instance, if the second user chooses to join a public session, manager 104 would proceed to steps 209 and 210. Otherwise, the second user needs to identify the private session to be joined, by the user ID of the creator of that session, as indicated at step 211.

In any event, at step 208, manager 104 causes a list of all the on-going sessions to be displayed on computer U-N including the medical form session created by the user of computer U-1. Manager 104 then proceeds to step 210 where it determines the particular session selected by the second user. In this example, the second user chooses to join the private medical form session by pointing and clicking using a mouse device at the listed topic. At step 212, surrogate 108-N is created on computer U-N, in a manner described before, within browser 106-N, which may be different from browser 106-1. Once surrogate 108-N is created, knowing that the medical form session was assigned to controller 103, manager 104 causes controller 103 to be connected to surrogate 108-N through link 107-N, as indicated at step 213.

At that point, a message is sent by controller 103 to each collaborator's computer connected thereto about the presence of a new collaborator. The user of U-N is then afforded a chance to visit the sequence of URLs that the session has gone through to review its history. This sequence of URLs has been recorded and is updated in controller 103 as the session progresses. The user of, U-N is also afforded an option to browse new HTML documents synchronously with other collaborators. When that option is exercised, controller 103 sends the current URL to surrogate 108-N. The latter then directs web browser 106-N to open the HTML document at the current URL. During the medical form session, when browser 106-1 initiates a change in the URL, the new URL information is obtained by surrogate 108-1, and the latter communicates this information to the surrogates of all other collaborators via controller 103. Each surrogate then directs its respective browser to open the HTML document at the new URL. As such, the collaborators manage to synchronously move from one URL to another to browse documents as the session progresses.

In this particular embodiment, the creator of the session is afforded the same capabilities as the other collaborators, except that the creator has the control of leading the session. In addition, the surrogates connected to controller 103 are programmed to allow the collaborators to communicate interactively in text with one another in real time.

FIG 3 is a flowchart illustrating the steps taken in a surrogate 108 employed in the process of FIGS. 2A and 2B and including an embodiment of the invention. Specifically, surrogate 108 in step 301 initializes by connecting to session controller 103 and to browser 106 and displaying the user interface. Then, control is transferred to steps 302 and 303. In step 302, surrogate 108 waits for an input and in step 303 a timer is set to a predetermined interval. Step 304 tests to determine if the timer has timed out, i.e., whether the predetermined interval has expired. Steps 303 and 304 are employed to insure that a polling cycle will be initiated after a predetermined interval of not receiving an input.

Thus, the surrogate 108, in this example, periodically checks the document structure for changes in the values of prescribed properties, e.g., document elements or form elements, of the document, and transmits changes to the other collaborators in a session via a communication channel. It is noted that the documents do not have to be "collaboration aware", i.e., documents that were not created with an awareness of the potential that they may be filled in by multiple cooperating users. The only requirement is that the surrogate be able to read and write properties of the document. To this end, the surrogate monitors the activity as collaborators, i.e., users, enter data into the documents and, specifically, in forms included in the documents, and the entered data is relayed to the other users' surrogates so that the forms are collaboratively filled in.

Returning to FIG. 3, control is then transferred from step 304 to step 305. Returning to step 302, upon an input control is transferred to step 305, which tests to determine if there is a user input. If the test result in step 305 is YES, control is transferred to step 306 where the user input is processed to generate a session or browser output. If the test result in step 305 is NO, control is transferred to step 307, which tests to determine if there is a session input. If the test result in step 307 is YES, control is transferred to step 306 where the session input is processed to generate a user or browser output. If the test result in step 307 is NO, control is transferred to step 308, which tests to determine if there is a browser input. If the test result in step 308 is YES, control is transferred to step 306 where the session input is processed to generate a session output. If the test result in step 308 is NO, control is transferred to step 309 and a browser polling cycle is initiated. A browser polling cycle is shown in FIG. 4 and described below. Upon completion of the polling cycle, control is returned to step 302 which is waiting for an input and to step 30 which sets a timer. Upon processing an input and generating an output in step 306, control is transferred to step 310, which tests to determine if there is a user output. If the test result in step 310 is YES, control is transferred to step 311, which sends the user output to a user interface (UI), control is transferred to steps 302 and 303, and the process is iterated as described above, i.e., appropriate ones of steps 302 through 315 are repeated. If the test result in step 310 is NO, control is transferred to step 312, which tests to determine if there is a browser output. If the test result in step 312 is YES, control is transferred to step 313, which sends the browser output to the browser, control is transferred to steps 302 and 303, and the process is iterated as described above, i.e., appropriate ones of steps 302 through 315 are repeated. If the test result in step 312 is NO, control is transferred to step 314, which tests to determine if there is a session output. If the test result in step 314 is YES, control is transferred to step 315, which sends the session output to the session. If the test result in step 314 is NO, control is transferred to steps 302 and 303 and the process is iterated as described above, i.e., appropriate ones of steps 302 through 315 are repeated.

In this example, the surrogate continuously keeps track of the state of the forms in a document by examining the form(s) structure. That is, the surrogate polls the structure of the form(s) in the document. For example, in a browser scripting language like JavaScript, "document.forms[0]" refers to the first form in the document, "document.forms[1].elements[0]" refers to the first element of the second form in the document and so on. To this end, the surrogate executes the following polling process for each shared window in the session:

if browser is at a new page
  for each form in the document
    for each element in the form
      remember the initial value of the form element
    loop
  loop
end-if
while the browser is at this page
  for each form in the document
    for each element in the form
      if current value of the form element differs from the
        saved value
        remember current value
        notify other users of new value
      end-if
    loop
  loop
loop When the other collaborators' surrogates receive notification of a change, the users assume that their document is identical to the source document, and update the corresponding data entry in their form.

FIG. 4 is a flowchart depicting the steps of applicants' unique polling loop including an embodiment of the invention that is employed in the surrogate of FIG. 3. Thus, the polling process is started via step 401. Thereafter, control is transferred to step 402, which tests to determine if the browser is a new document page. If the test result in step 402 is YES, control is transferred to step 403, which causes the storage of the initial values of each element in each form of the new document page. Then, step 404 goes to the first form on the new page. Thereafter, control is transferred to step 405, which tests to determine if the current form element has changed. Returning to step 402, if the test result is NO, the browser is not at a new page and control is transferred to step 405. If the test result in step 405 is YES, step 406 causes a form element value change event, i.e., a browser input, to be generated and supplied as an input to step 302 and 303 of the surrogate in FIG. 3. Then, control is transferred to step 407, which tests to determine if this is the last form element change. If the test result in step 407 is NO, control is transferred to step 408. Returning to step 405, if the test result is NO, control is transferred to step 408, which tests to determine if this is the last element of the current form. If the test result in step 408 is NO, it is not the last element in the form and step 409 causes the process to go, i.e., route, to the next form element and control is then returned to step 406. If the test result in step 408 is YES, the current form element is the last element of the current form and control is transferred to step 410. Returning to step 407, if the test result is YES the current form element change is the last one and control is transferred to step 410. Step 410 tests to determine if the current form is the last form in the document. If the test result in step 410 is NO, the current form is not the last form in the document and step 411 causes the process to go, i.e., route, to the next form in the document and control is returned to step 405. Thereafter, steps 405 through 411 are iterated until step 410 yields a YES result indicating that all the forms in the document have been completed. Then, the unique polling process is stopped, i.e., terminted, via step 412 and control is returned to the surrogate of FIG. 3.

Figure 5:
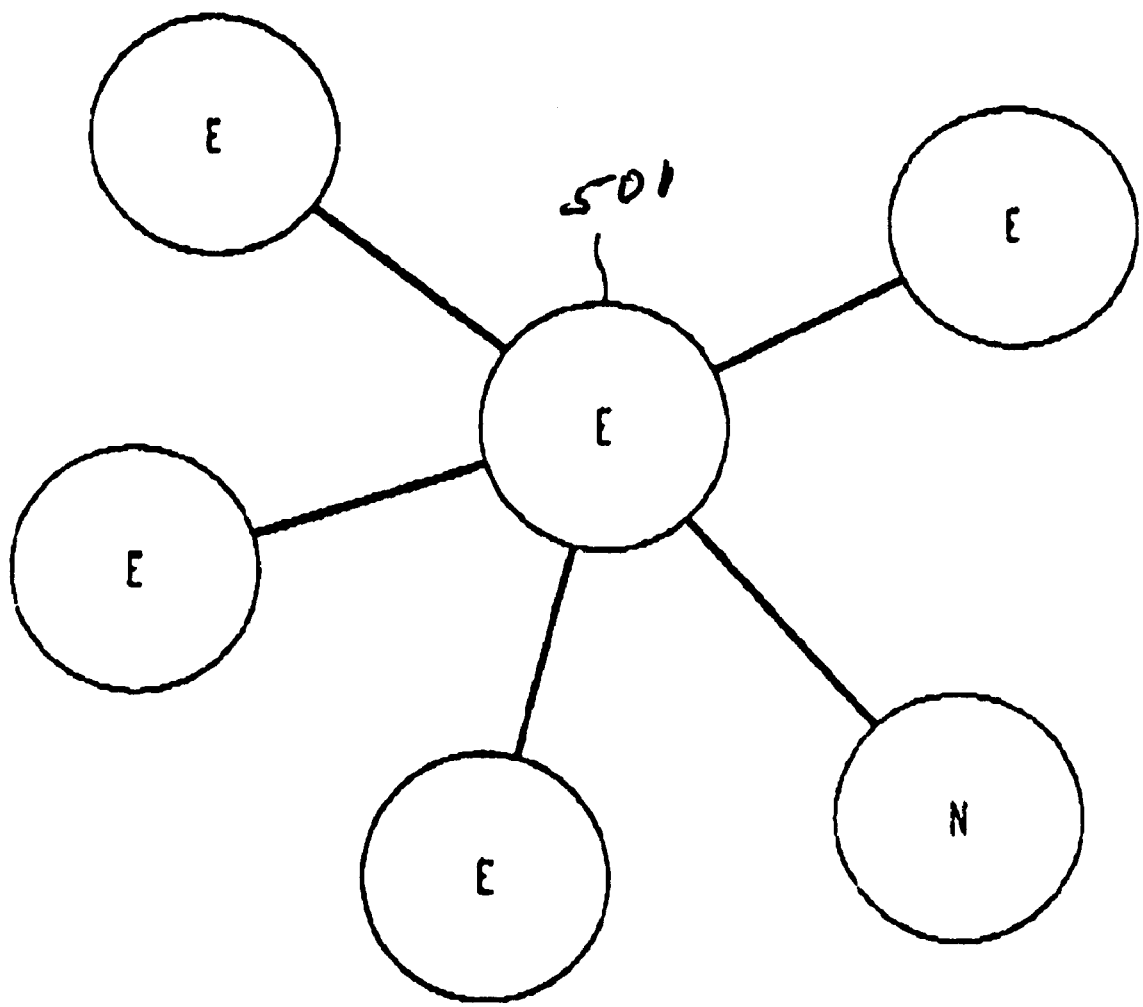
FIG. 5 illustrates a hierarchy of multiple controllers in the system of FIG. 1.

In the course of a session, the collaborators may point and click at a specified icon on their computers using a mouse device to make, for example, text-chat connections for exchanging their opinions on filling out the form elements as the HTML documents unfold before them. However, it will be appreciated that a person skilled in the art may program controller 103 to enforce certain access control. For example, controller 103 may afford different collaborators 103 different capabilities during a collaborative session. Controller 103 may also enforce a priority scheme whereby the collaborators take turns to lead the session and communicate with one another. Other computer users who want to either create a session or join an on-going session go through the similar process to that of U-1 through U-N described above. However, a controller may be overloaded at a certain point as more and more collaborators joining a particular session regulated by the controller. Because of the server-based architecture of system 100 where intelligence and information on every user's connection resides in manager 104, the system capacity is readily scaleable to accommodate a growing number of the collaborators, without affecting the service quality. Once the number reaches a predetermined threshold at a controller, manager 104 employs a new controller to connect the additional collaborators. The new controller and existing controllers for the same session dynamically reorganize themselves in a hierarchy to facilitate communications with one another and their coordination to carry out the session in a synchronous manner. FIG. 5 illustrates one such hierarchy, where the existing controllers (denoted by circles marked "E") and the new controller (denoted by a circle marked "N") form a star topology. In this hierarchy, controller 501 acts as an information center and efficiently distributes information from any of the controllers to all other controllers.

Furthermore, as more and more controllers are engaged, the initial capacity of system 100 may run out. Again, because of the inventive architecture of system 100, a new controller may be engaged using additional hardware, which can be easily absorbed into system 100.

Similarly, when the number of sessions exceeds a predetermined threshold, multiple managers similar to manager 104 are instituted and the managers are dynamically reorganized in a hierarchy similar to that of FIG. 5.

The foregoing merely illustrates the principles of the invention. It will be appreciated that a person skilled in the art can readily devise numerous other systems and techniques, which embody the principles of the invention and, therefore, are within its spirit and scope.

What is claimed is:

1. A method for use in a user device including a browser for obtaining information from a communication system, the browser causing a document to be displayed including at least one form having at least one form element for containing a prescribed data value, the method comprising the steps of:

creating a surrogate in said user device;
said surrogate including
polling said browser to detect any change in said prescribed data value of said at least one form element data value by (a) storing an initial data value of said at least one form element, (b) determining whether said data value of said at least one form element has changed from its initial data value, if the result in step (b) is YES, (c) generating a form element change event for said data value of said at least one form element, and (d) supplying said form element data value change event as said browser input;
supplying a representation of any detected change in said prescribed data value of said at least one form element as a browser input;
processing said browser input to generate a prescribed output, said prescribed output being a representation of a changed data value for said at least one form element; and
supplying as an output to said communication system said generated prescribed output.

2. The method as defined in claim 1 wherein said surrogate further includes a step of initiating said step of polling after a prescribed interval has elapsed of not receiving an input.

3. The method as defined in claim 1 wherein said communication system includes a World Wide Web (WWW).

4. The method as defined in claim 1 wherein said step of polling further includes, if the result in step (b) is NO, (e) determining if the at least one form element is the last element in the at least one form, if the result of step (e) is NO, (f) going to a next form element in said at least one form and repeating appropriate ones of steps (b) through (f).

5. The method as defined in claim 4 wherein said step of polling further includes (g) determining whether said change in said data value of said at least one form element is the last change in a data value of a form element in said at least one form, if the result in step (g) is NO, repeating appropriate ones of steps (b) through (g).

6. The method as defined in claim 5 wherein, if the result in step (e) is YES, (h) determining if said at least on form is the last form of the document, if the result of step (h) is NO, (i) going to a next form in the document and repeating appropriate ones of steps (b) through (i).

7. The method as defined in claim 6 wherein, if the result in step (h) is YES, (j) terminating the polling step.

8. The method as defined in claim 6 wherein, if the result in step (g) is YES, repeating appropriate ones of steps (b) through (i).

9. The method as defined in claim 8 wherein, if the result in step (h) is YES, (j) terminating the polling step.

10. A method for use in a server system that provides communication in synchrony among user devices in a session via a communication system, said session including a first user device and an at least second user device, each user device including a browser for obtaining information from said server system, each browser causing a document to be displayed at each user device including at least one form having at least one form element for containing a prescribed data value, the method comprising the steps of:

creating a surrogate in each of said user devices;
said surrogate including
polling said browser to detect any change in said prescribed data value of said at least one form element data value by (a) storing an initial data value of said at least one form element, (b) determining whether said data value of said at least one form element has changed from its initial data value, if the result in step (b) is YES, (c) generating a form element change event for said data value of said at least one form element, and (d) supplying said form element data value change event as said browser input;

supplying a representation of any detected change in said prescribed data value of said at least one form element as a browser input;

processing said browser input to generate a prescribed output, said prescribed output being a representation of a changed data value for said at least one form element; and supplying as an output to all user devices in said session said generated prescribed output, wherein a plurality of users can collaboratively make changes in said at least form element value.

11. The method as defined in claim 10 wherein said surrogate further includes a step of initiating said step of polling after a prescribed interval has elapsed of not receiving an input.

12. The method as defined in claim 10 wherein said communication system includes a World Wide Web (WWW) and said server system includes a WWW server.

13. The method as defined in claim 10 wherein said step of polling further includes, if the result in step (b) is NO, (e) determining if the at least one form element is the last element in the at least one form, if the result of step (e) is NO, (f) going to a next form element in said at least one form and repeating appropriate ones of steps (b) through (f).

14. The method as defined in claim 13 wherein said step of polling further includes (g) determining whether said change in said data value of said at least one form element is the last change in a data value of a form element in said at least one form, if the result in step (g) is NO, repeating appropriate ones of steps (b) through (g).

15. The method as defined in claim 14 wherein, if the result in step (e) is YES, (h) determining if said at least on form is the last form of the document, if the result of step (h) is NO, (i) going to a next form in the document and repeating appropriate ones of steps (b) through (i).

16. The method as defined in claim 15 wherein, if the result in step (h) is YES, (j) terminating the polling step.

17. The method as defined in claim 16 wherein, if the result in step (g) is YES, repeating appropriate ones of steps (b) through (i).

18. The method as defined in claim 17 wherein, if the result in step (h) is YES, (j) terminating the polling step.

19. Apparatus for use in a user device including a browser for obtaining information from a communication system, the browser causing a document to be displayed including at least one form having at least one form element for containing a prescribed data value, the user device comprising:

a first processor responsive to supplied programming code for creating a surrogate in said user device;

said surrogate including a poller for polling said browser to detect any change in said prescribed data value of said at least one form element data value including a storage unit for storing an initial data value of said at least one form element, a first tester for determining whether said data value of said at least one form element has changed from its initial data value, a second processor, responsive to a YES result from said first tester, for generating a form element change event for said data value of said at least one form element, and a second supplier for supplying said form element data value change event as said browser input;

a first supplier for supplying a representation of any detected change in said prescribed data value of said at least one form element as a browser input;

a generator responsive to said browser input for generating a prescribed output, said prescribed output being a representation of a changed data value for said at least one form element; and an outputter for supplying as an output to said communication system said generated prescribed output.

20. The apparatus as defined in claim 19 wherein said surrogate further includes a timer of initiating said polling of said browser after a prescribed interval has elapsed of not receiving an input.

21. The apparatus as defined in claim 19 wherein said communication system includes a World Wide Web (WWW).

22. The apparatus as defined in claim 19 wherein said poller further includes, a second tester, responsive to a NO result from said first tester, for determining if the at least one form element is the last element in the at least one form, a first router, responsive to a NO result from said second tester, for going to a next form element in said at least one form.

23. The apparatus as defined in claim 22 wherein said poller further includes a third tester for determining whether said change in said data value of said at least one form element is the last change in a data value of a form element in said at least one form, a second router, responsive to a NO result from said third tester, for going to a next form element in said at least one form.

24. The apparatus as defined in claim 23 wherein said poller further includes a fourth tester, responsive to a YES result from said third tester, for determining if said at least one form is the last form of the document, a third router, responsive to a NO result from said fourth router, for going to the next form in the document.

25. Apparatus for use in a server system that provides communication in synchrony among user devices in a session via a communication system, said session including a first user device and an at least second user device, each user device including a browser for obtaining information from said server system, each browser causing a document to be displayed at each user device including at least one form having at least one form element for containing a prescribed data value, each of the user devices comprising:

a first processor responsive to supplied programming code for creating a surrogate in said user device;

said surrogate including a poller for polling said browser to detect any change in said prescribed data value of said at least one form element data value including a storage unit for storing an initial data value of said at least one form element, a first tester for determining whether said data value of said at least one form element has changed from its initial data value, a second processor, responsive to a YES result from said first tester, for generating a form element change event for said data value of said at least one form element, and a second supplier for supplying said form element data value change event as said browser input;

a first supplier for supplying a representation of any detected change in said prescribed data value of said at least one form element as a browser input;

a generator responsive to said browser input for generating a prescribed output, said prescribed output being a representation of a changed data value for said at least one form element; and an outputter for supplying as an output to said communication system said generated prescribed output, wherein a plurality of users can collaboratively make changes in said at least form element value.

26. The apparatus as defined in claim 25 wherein said surrogate further includes a timer of initiating said polling of said browser after a prescribed interval has elapsed of not receiving an input.

27. The apparatus as defined in claim 25 wherein said communication system includes a World Wide Web (WWW) and said server system includes a WWW server.

28. The apparatus as defined in claim 25 wherein said poller further includes, a second tester, responsive to a NO result from said first tester, for determining if the at least one form element is the last element in the at least one form, a first router, responsive to a NO result from said second tester, for going to a next form element in said at least one form.

29. The apparatus as defined in claim 28 wherein said poller further includes a third tester for determining whether said change in said data value of said at least one form element is the last change in a data value of a form element in said at least one form, a second router, responsive to a NO result from said third tester, for going to a next form element in said at least one form.

30. The apparatus as defined in claim 29 wherein said poller further includes a fourth tester, responsive to a YES result from said third tester, for determining if said at least one form is the last form of the document, a third router, responsive to a NO result from said fourth tester, for going to a next form in the document.

31. Apparatus for use in a user device including a browser for obtaining information from a communication system, the browser causing a document to be displayed including at least one form having at least one form element for containing a prescribed data value, the user device comprising:

means responsive to supplied programming code for creating a surrogate in said user device;

said surrogate including means for polling said browser to detect any change in said prescribed data value of said at least one form element data value including means for storing an initial data value of said at least one form element, first means for determining whether said data value of said at least one form element has changed from its initial data value, means, responsive to a YES result from said first means, for generating a form element change event for said data value of said at least one form element, and means for supplying said form element data value change event as said browser input;

means for supplying a representation of any detected change in said prescribed data value of said at least one form element as a browser input;

means responsive to said browser input for generating a prescribed output, said prescribed output being a representation of a changed data value for said at least one form element; and means for supplying as an output to said communication system said generated prescribed output.

32. The invention as defined in claim 31 wherein said surrogate further includes means for initiating said polling of said browser after a prescribed interval has elapsed of not receiving an input.

33. The invention as defined in claim 31 wherein said communication system includes a World Wide Web (WWW).

34. The invention as defined in claim 31 wherein said means for polling further includes, second means, responsive to a NO result from said first means, for determining if the at least one form element is the last element in the at least one form, first router means, responsive to a NO result from said second means, for going to a next form element in said at least one form.

35. The invention as defined in claim 34 wherein said means for polling further includes third means for determining whether said change in said data value of said at least one form element is the last change in a data value of a form element in said at least one form, second router means, responsive to a NO result from said third means, for going to a next form element in said at least one form.

36. The invention as defined in claim 35 wherein said means for polling further includes a fourth means, responsive to a YES result from said third means, for determining if said at least one form is the last form of the document, third router means, responsive to a NO result from said fourth means, for going to a next form in the document.

37. A server system that provides communication in synchrony among user devices in a session via a communication system, comprising:

a first user device;

an at least second user device, said first user device and said at least second user device being used in said session and each user device including a browser for obtaining information from said server system, each browser causing a document to be displayed at each user device including at least one form having at least one form element for containing a prescribed data value;

each of said user devices further including a first processor responsive to supplied programming code for creating a surrogate in said user device;

said surrogate including a poller for polling said browser to detect any change in said prescribed data value of said at least one form element data value including a storage unit for storing an initial data value of said at least one form element, a first tester for determining whether said data value of said at least one form element has changed from its initial data value, a second processor, responsive to a YES result from said first tester, for generating a form element change event for said data value of said at least one form element, and a second supplier for supplying said form element data value change event as said browser input;

a first supplier for supplying a representation of any detected change in said prescribed data value of said at least one form element as a browser input;

a generator responsive to said browser input for generating a prescribed output, said prescribed output being a representation of a changed data value for said at least one form element; and an outputter for supplying as an output to said communication system said generated prescribed output to be supplied to at least one other of said surrogates in at least one other of said user devices, wherein a plurality of users can collaboratively make changes in said at least form element value.

38. The invention as defined in claim 37 wherein said surrogate further includes a timer of initiating said polling of said browser after a prescribed interval has elapsed of not receiving an input.

39. The invention as defined in claim 37 wherein said communication system includes a World Wide Web (WWW) and said server system includes a WWW server.

40. The invention as defined in claim 37 wherein said poller further includes, a second tester, responsive to a NO result from said first tester, for determining if the at least one form element is the last element in the at least one form, a first router, responsive to a NO result from said second tester, for going to a next form element in said at least one form.

41. The invention as defined in claim 40 wherein said poller further includes a third tester for determining whether said change in said data value of said at least one form element is the last change in a data value of a form element in said at least one form, a second router, responsive to a NO result from said third tester, for going to a next form element in said at least one form.

42. The invention as defined in claim 41 wherein said poller further includes a fourth tester, responsive to a YES result from said third tester, for determining if said at least one form is the last form of the document, a third router, responsive to a NO result from said fourth router, for going to a next form in the document.

* * * * *